United States Patent
Korber et al.

[11] 3,782,188
[45] Jan. 1, 1974

[54] APPARATUS FOR MEASURING MUSCULAR CONTRACTIONS AND THE LIKE

[75] Inventors: Karl-Heinz Korber, Kiel-Heikendorf; Hermann Steiert, Bucheim; Heinz Dehnert, Freiburg, all of Germany

[73] Assignee: Hugo Sachs Elektronik KG, Am Bahnhof, Hugstetten, Germany

[22] Filed: Nov. 20, 1972

[21] Appl. No.: 307,905

[30] Foreign Application Priority Data
Dec. 17, 1971 Germany.............. P 21 62 683.5

[52] U.S. Cl............... 73/141 AB, 73/380, 128/2 R
[51] Int. Cl............................ A61b 5/05, G01l 5/02
[58] Field of Search .................... 73/78, 80, 81, 89, 73/94, 141 AB, 379, 380, 381; 33/143 C, 174 D; 128/2 R, 2 S

[56] References Cited
UNITED STATES PATENTS

| | | | |
|---|---|---|---|
| 1,619,491 | 3/1927 | Smith | 73/81 |
| 3,390,572 | 7/1968 | Murr | 73/80 |
| 3,420,222 | 1/1969 | Noe et al. | 73/380 X |
| 3,677,074 | 7/1972 | Murr | 73/80 |

FOREIGN PATENTS OR APPLICATIONS

| 818,686 | 8/1959 | Great Britain | 128/2 S |
|---|---|---|---|

*Primary Examiner*—Charles A. Ruehl
*Attorney*—William D. Hall et al.

[57] ABSTRACT

An apparatus is provided for measuring the displacement of an object which is acted upon by a force, e.g., to measure muscular contractions, or to measure thoracic motion during breathing, or to measure tooth mobility. The apparatus comprises a first measuring rod which engages the object to be measured, and a second measuring rod engaging a reference point which is stationary relative to the object being measured. A spring, which may be replaceable to select appropriate spring characteristics, is disposed between one side of a housing and the first measuring rod; and an electrical sensing device is provided to measure forces which act upon the spring. A second electrical sensing device, associated with both the first and second measuring rods, is provided to measure relative motion between the first and second measuring rods. The two rods are mounted parallel to one another, and a third measuring rod, mounted parallel to the first and second rods and placed on the side of said first rod opposite to said second rod, may also be provided, and associated with a third electrical sensing device associated with the first and third measuring rods, to provide a further measure of relative motion between the first and third measuring rods.

13 Claims, 1 Drawing Figure

PATENTED JAN 1 1974                                              3,782,188
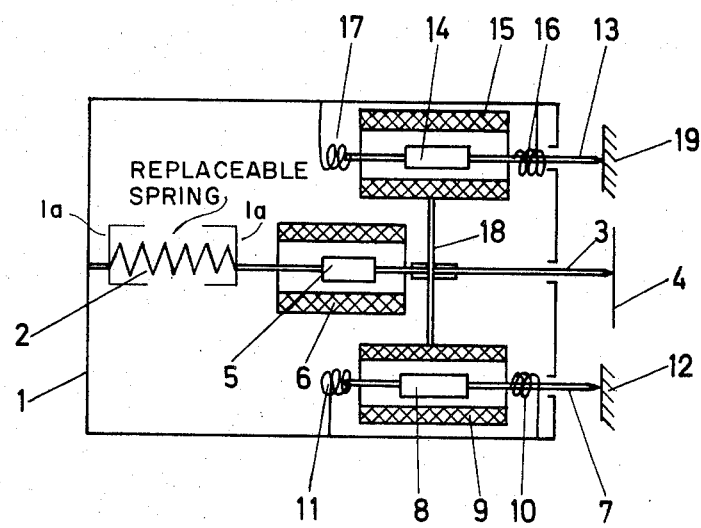

APPARATUS FOR MEASURING MUSCULAR CONTRACTIONS AND THE LIKE

BACKGROUND OF THE INVENTION

The present invention is concerned with an apparatus for measuring the displacement of an object which is acted upon by a force, e.g., to measure muscular auxotonic or isometric contractions, or to measure the breathing motion of the thorax, or to measure tooth mobility, i.e., the mobility of a tooth when that tooth is acted upon by a force.

When measuring muscular activity, it has been found extremely difficult to detect auxotonic contractions of a muscle. Such auxotonic contractions relate to the strength generated by the muscle with a simultaneous change in its length. Various devices have been suggested heretofore for making such measurements, e.g., flexible elements have sometimes been employed which engage the muscle, and means have been provided for measuring the deflection of the elements to indicate muscular strength. Measuring techniques of this type have been found to be very tedious since the muscle to be measured must be prestressed to a certain extent, with such prestressing usually being accomplished by weights which are connected to the flexible element by means of a pulley. It has also been necessary, in the case of such measurements, to take into consideration the weight of the portion of the body concerned, and this in turn has likewise been accomplished by appropriate weight compensations. As a result of these difficulties, measurements have been effected by the apparatuses of the prior art only after extensive and time-consuming preparatory adjustments which can be carried out only at a stationary work bench; and, as a result, the muscle to be tested, i.e., the animal involved in the testing procedure, had to be transported to the measuring and working station. Identical problems have arisen when it has been desired to test the breathing motion of the thorax.

In those cases where it has been desired to test tooth flexibility or tooth mobility, it has been customary to subject the tooth being measured to a certain force, and to measure movement of the tooth in relation to the applied load and the time of its application. The tooth to be measured has normally been connected at its rear side to the adjacent tooth by an appropriate strip element adapted to measure elongation, and the tooth has then been loaded down by weights. By reason of these requirements, tooth mobility or tooth flexibility measurements have been very tedious and, in most cases, have been quite inaccurate. It has been found difficult to load the tooth with weights which are applied precisely and vertically to the tooth axis, and it has also been necessary to have the tooth take up a specific spatial position during the measuring operation, and to maintain this position at least during the weight loading period.

It is accordingly the primary object of the present invention to provide a measuring apparatus which makes it much easier to carry out the various types of measurements described above, and other related measurements which will be apparent to those skilled in the art. In particular, the present invention is concerned with the provision of an apparatus which can permit measurements, of the types described, to be effected at any place desired. The apparatus also permits the application of a prestressing or a preload force to the object being measured, and makes it possible to quickly and easily measure changes in position or displacements which occur when a force is applied to the object being measured, or when the object being measured generates a force of its own.

SUMMARY OF THE INVENTION

In accordance with the present invention, a measuring apparatus is provided which comprises a houing containing a spring which is supported at one end by the housing, and which is attached at its other end to a first measuring rod projecting outwardly from the housing and adapted to engage an object being measured. A first signal source or sensing device, e.g., a variable inductance or capacitance, is associated with the spring to provide a measure of the forces acting upon or exerted by the spring. A second measuring rod is mounted in the housing, and projects therefrom, in a direction parallel to the first rod. The second measuring rod is provided with means exerting a restoring force thereon which is negligible in relation to the force exerted by the aforementioned spring; and the second measuring rod is adapted to engage a reference point which is stationary relative to the object to be measured. A second signal source or sensing device is provided to measure any relative motion between the first and second measuring rods.

The apparatus preferably includes a third measuring rod, of the same kind as the second measuring rod, disposed on the opposite side of the first measuring rod at the same distance therefrom as said second measuring rod. The third measuring rod is also adapted to engage a reference point which is stationary relative to the object being measured, and includes a third signal source or sensing device which provides a measure of the relative motion between the first and third measuring rods. The output signals produced by the second and third sensing devices can be used together to provide an average measurement, thereby reducing the possibility of error caused by a tilting of the measuring apparatus relative to the object being measured, when measurements are being taken with the apparatus held in the operator's hand.

BRIEF DESCRIPTION OF THE DRAWINGS

The drawings depict, in schematic form, a measuring apparatus constructed in accordance with a preferred embodiment of the present invention.

DESCRIPTION OF THE PREFERRED EMBODIMENT

As illustrated in the drawings, the measuring apparatus of the present invention comprises a housing 1 which contains a spring 2 adapted to provide tension and/or compression stress, and preferably mounted within a portion 1a of the housing in such fashion that it can be replaced by a spring, preferably of equal length, exhibiting different spring characteristics to adapt the device for a variety of different measuring applications. One side of spring 2 is connected to the housing 1, and its other side is connected to a first measuring rod 3 which projects outwardly of the housing and which is adapted to be affixed to an object 4 the displacement of which is to be measured.

A first signal source is associated with the spring 2 to measure forces produced by or exerted upon said spring. The first signal source is illustrated in the drawings as a variable inductance, comprising a coil 6 fixedly mounted on the housing 1, and a core 5 movable within said coil and disposed between spring 2 and measuring rod 3 for movement with said measuring rod and spring. Rather than employing a variable inductance or other type of inductive unit, the sensing device 5, 6 (as well as the other sensing devices to be described hereinafter) can comprise variable capacitors or capacitive sensing units. It will further be appreciated that the signal source or sensing device 5, 6, whatever its form, and the other sensing devices to be described hereinafter, are associated with an appropriate electrical circuit (not shown) adapted to convert variations in the inductance and/or capacitance of the sensing unit into an output signal adapted to actuate an appropriate indicator or meter. Many such circuits are known in the art for various measuring applications.

A second measuring rod 7 is also held, or guided, for movement within the housing 1 and projects outwardly therefrom for support at a reference point 12 which is stationary relative to the object being measured. The measuring rod 7 is held in place relative to the housing 1 by two relatively soft springs 10 and 11 which exhibit a spring force that is negligibly low in comparison with the force exerted by spring 2, assuming identical deflections for said springs. A second signal source 8, 9 is disposed between the first measuring rod 3 and the second measuring rod 7 to provide a signal which indicates the amount of relative motion between, or relative displacement between, measuring rod 3 and 7. In the embodiment shown in the drawings, the second signal source again comprises an inductive unit which includes a coil 9 and a core 8 movable therein. Coil 9 is connected rigidly to measuring rod 3, by means of a connector element 18, whereby said coil 9 is adapted to move longitudinally with movement of measuring rod 3. Core 8 moves longitudinally with corresponding movement of measuring rod 7. As mentioned earlier, the second signal source 8, 9 can be a capacitive unit, rather than an inductive unit.

In the preferred embodiment of the present invention, a third measuring rod 13 is also mounted within housing 1, and projects outwardly therefrom for engagement with a further reference point 19 which is stationary relative to the object 4 being measured. The third measuring rod 13 is associated with a third signal source or sensing device 14,15, comprising a coil 14 which is rigidly connected, via connecting element 18, to measuring rod 3, and a core 14 which is movable with measuring rod 13. The third measuring rod is kept in place relative to housing 1 by a pair of soft springs 16,17.

Measuring rod 13 is mounted parallel to each of rods 3 and 7, and is positioned on the side of rod 3 opposite to that of rod 7 with the distances between rods 3 and 13, and rods 3 and 7, being equal. The parts 13–17 are identical in structure and operation to the parts 7–11, whereby both of the sensing devices 8, 9 and 14–15 produce output signals simultaneously, indicative of relative motion between, or relative displacement between, rods 3 and 13 and rods 3 and 7 simultaneously. This dual output signal arrangement is provided to assure that more accurate measurements can be taken when the measuring device is held by hand. Any errors which might result from a tilting of the measuring apparatus relative to the object being measured can be substantially eliminated by feeding the two signals, produced by the two sensing devices 8, 9 and 14,15, to a delta connection to produce a mean value of signal which is indicative of the exact displacement object 4 being measured and stationary reference points 12, 19.

The connecting element 18, which affixes coils 9 and 15 to measuring rod 3, is preferably provided with a releasable connection between elements 18 and 3 to permit the positions of the two coils to be adjusted relative to rod 3. The arrangement thus permits the second and third sensing devices to be moved longitudinally relative to rod 3, and then to be locked in place relative to rod 3, to permit appropriate adjustments to be made during operation of the measuring apparatus.

When the apparatus is to be employed to measure auxotonic muscular contractions, one end of a muscle being measured is connected to the front end of the first measuring rod 3 at point 4. The other end of the muscle is situated at a stationary point which is fixedly connected to both of reference points 12 and 19. In order to prestretch the muscle, the housing 1 is then moved away from the muscle so as to place the spring 2 under partial tension; and in the course of moving housing 1 away from the muscle, coil 6 simultaneously moves relative to core 5 to provide a signal related to the tension being exerted by spring 2. When this force is exerted upon the muscle, moreover, the length of the muscle will also change thereby causing the measuring rod 3 to shift relative to measuring rods 7 and 13. This change in muscle length, although of secondary importance when measuring the auxotonic contraction of the muscle, can be measured, if desired, by means of signal units 8, 9 and 14, 15.

After the muscle has been prestretched by the technique described above, its auxotonic contraction can now be measured. As discussed above, the prestretching or preload applied to the muscle (or to any of the other objects to be measured by the present invention) may cause a relative motion between measuring rod 3 and measuring rod 7 and 13; and, in order to compensate for this relative movement at the time the final measurement is being taken, the connecting element 18 can first be moved lengthwise relative to measuring rod 3 by an amount corresponding to the change in position resulting from the prestretching or preloading, and then locked in place. The muscle is then caused to exhibit an auxotonic contraction so that, as it contracts, it exerts a force. This force, and the simultaneous change in muscle length, is taken up by the first measuring rod 3 and transmitted to the spring 2. The elongation of spring 2 provides a measure of the force exerted by the muscle and can be determined by means of signal unit 5, 6. The change in length of the muscle which occurs at the same time can be measured by means of signal units 8, 9 and 14, 15.

If the spring 2 is made relatively strong, the apparatus of the present invention can measure isometric contractions of a muscle by an operating sequence similar to that described above.

When the apparatus is to be employed for measuring the breathing motion of the thorax, the measuring rod 3 can be placed upon the thorax while the measuring rods 7 and 13 are supported at stationary reference points which are fixedly connected to the contact surface at which the thorax is located. The thorax is subjected to a preload which corresponds to the pressure exerted upon the housing 1, with this preload causing a compression of the spring 2. The forces generated by the breathing motion of the thorax are then measured by means of signal unit 5,6, while changes in position of the thorax, due to expansion and contraction of the thorax, are measured by means of signal units 8, 9 and 14, 15.

When the apparatus is to be employed to measure tooth mobility or tooth flexibility, the measuring rod 3 is placed upon the tooth being measured while the measuring rods 7 and 13 are supported at adjacent teeth. The pressure is exerted upon housing 1, and thus upon the tooth to be measured, so as to cause a compression of spring 2; and this pressure force is measured by means of signal unit 5, 6. Any movement of the tooth to a new position will then be measured by means of signal units 8, 9 and 14, 15. In this usage of the invention, line 4 shown in the drawings can be considered to represent the tooth being measured while lines 12 and 19 can be considered to indicate adjacent teeth which serve as fixed reference points relative to tooth 4.

While a number of possible measurement applications have been described, many other applications wherein the apparatus of the present invention can be employed will be apparent to those skilled in the art. Measurements can be taken under conditions where the spring 2 is either in compression or under tension; and the measuring apparatus can be suitably employed in any and all instances where forces acting upon an object to be measured or forces exerted by such an object, produce a displacement in the position of the object which is not proportional to the relevant force. The measuring apparatus is particularly useful in cases where displacement, due to a force acting upon an object to be measured or exerted by such an object, occur over periods of time which are not contemporaneous with the actual emergence of the force, i.e., over periods of time which are shifted relative to, or extended in comparison with, the time the force is applied to, or exerted by, the object being measured. The diverse possible utilizations of the apparatus, coupled with the fact that measurements can be accomplished with the apparatus held in the operator's hand, thus give the apparatus of the present invention considerable advantages over prior art apparatuses employed for related purposes.

Having thus described our invention, we claim:

1. A measuring apparatus for measuring the displacement of an object which is acted upon by a force, or which exerts a force, comprising at least first and second parallel measuring rods mounted for translational movement and adapted to engage an object being measured and a stationary reference point respectively, spring means coupled to said first measuring rod, first sensing means for measuring spring forces exerted by said spring means on said first measuring rod, and second sensing means for measuring relative displacements between said first and second measuring rods.

2. The apparatus of claim 1 wherein said first and second rods are mounted for movement within a housing, each of said rods including corresponding first ends projecting outwardly of said housing for engagement with said object and with said reference point respectively, said spring means being mounted within said housing between a fixed portion of said housing and the other end of said first rod.

3. The apparatus of claim 2 including resilient means, having a restoring force negligible in comparison to the forces exerted by or on said spring means, coupled to said second measuring rod for positioning said second rod relative to said housing.

4. The apparatus of claim 2 wherein said spring is removably mounted in said housing, for replacement by a different spring exhibiting different spring characteristics.

5. The apparatus of claim 2 wherein said first sensing means comprises a first pair of relatively displaceable elements coupled to said first rod and to said housing respectively, said second sensing means comprising a second pair of relatively displaceable elements coupled to said first rod and to said second rod respectively.

6. The apparatus of claim 5 wherein said first pair of relatively displaceable elements comprise an electrical coil and a core movable therein.

7. The apparatus of claim 6 wherein said coil is connected to said housing and said core is connected to said first rod.

8. The apparatus of claim 5 wherein said second pair of relatively displaceable elements comprise an electrical coil and a core movable therein.

9. The apparatus of claim 8 wherein said core is connected to said second measuring rod, said coil being connected to said first measuring rod by means of a releasable coupling operative to permit said coil to be shifted laterally relative to said first measuring rod and then to be locked in a desired position relative to said first measuring rod.

10. The apparatus of claim 2 including a third measuring rod mounted parallel to said first and second rods for movement within said housing and having an end projecting from said housing for engagement with a stationary reference point, and third sensing means for measuring relative displacements between said first and third measuring rods.

11. The apparatus of claim 10 wherein said first, second and third sensing means comprises first, second, and third variable inductors respectively.

12. The apparatus of claim 11 including connecting means for connecting portions of each of said second and third variable inductors to said first measuring rod, said connecting means including selectively releasable and lockable means for permitting adjustments in the positions of said inductor portions relative to said first measuring rod.

13. The apparatus of claim 10 wherein said second and third measuring rods are equidistantly spaced from said first rod.

* * * * *